April 15, 1969  J. A. WILSON  3,438,392
MULTI-PURPOSE LIQUID TRANSFER VALVE
Filed May 19, 1967
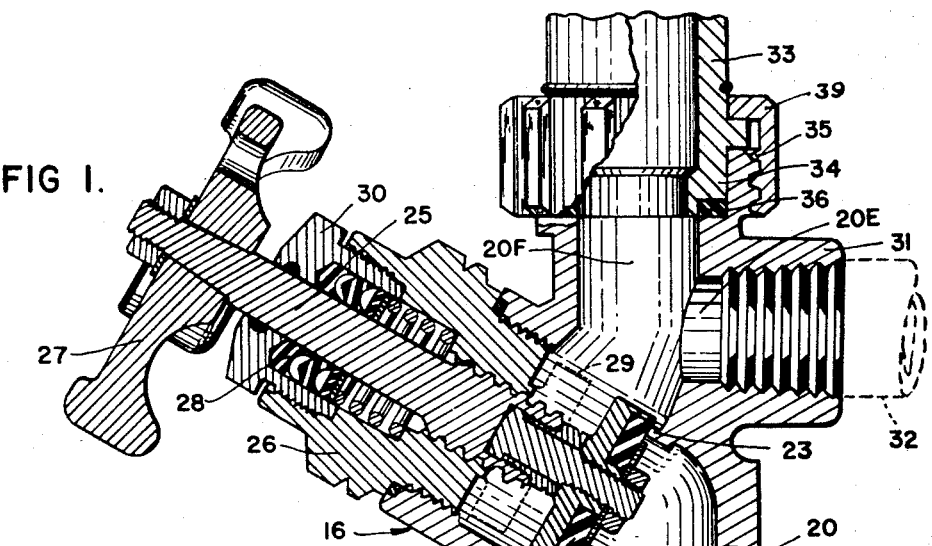
INVENTOR.
Jesse A. Wilson
BY
Harbaugh & Thomas
ATTYS United States Patent Office 3,438,392
Patented Apr. 15, 1969

3,438,392
MULTI-PURPOSE LIQUID TRANSFER VALVE
Jesse Allen Wilson, Palatine, Ill., assignor to The Bastian-Blessing Company, Chicago, Ill., a corporation of Illinois
Filed May 19, 1967, Ser. No. 639,684
Int. Cl. F16k 11/00, 21/00
U.S. Cl. 137—517
11 Claims

ABSTRACT OF THE DISCLOSURE

A flow control three position dual spring controlled valve which snaps shut as an excess flow check valve with flow in one direction through a shut-off valve, and, with flow in the opposite direction, accommodates maximum flow capacity permitted by the shut-off valve. The flow control valve preferably is mounted on the shut-off valve for disposition within a tank flange or associated conduit and provides a high degree of excess flow control accuracy in any orientation.

---

This invention relates to an improved valve construction and to a combination excess flow check and filler valve arrangement which can be mounted on another type valve body to cooperate with a valve seat that is provided therefor, preferably upon that valve body, for reception in a mounting flange or within a conduit associated with the valve body.

It is highly desirous in liquefied gas systems that check valves be associated with shut-off valves that control the flow of gas from a source of liquefied gas pressure through a single tank opening or conduit so that if there is a rupture beyond the check valve, flow will be stopped until the dangerous conditions can be corrected.

Excess flow check valves have been used heretofore protectively in such systems, particularly in eduction conduits. However, in order to be operative, the valve must be normally open for service flows yet the flow opening afforded by the check valve must be substantially less than the full flow capacity of the conduit being protected, thereby requiring a two position valve for acceptable operativeness, namely, open and closed. Due to low service flow the conduit is accordingly generally smaller because larger conduits would be impractically oversized. On the other hand if the small size conduit is quite long then flow friction reduces sensitivity to excess flow conditions. Furthermore, the presence of such a two position check valve in a conduit limits the usefulness of the conduit to flow in one direction and thereby makes it necessary to provide a second and large size conduit means for flow in the opposite direction. The latter is then protected with a back flow check valve. The back flow check valve, of course, prevents use of the larger conduit as a service conduit.

In the present invention a check valve construction is provided which can be mounted on the tank end of a valve body, such as a hand shut-off valve, and will provide the highest degree of accuracy and sensitivity both as an excess flow check valve for a large eduction conduit, and a back flow check valve when the conduit is used for filling operations. Thereby both eduction and filling operations can be accomplished with maximum effectiveness and safety through a single opening and shut-off valve in a liquefied gas dispensing system, and beyond the shut-off valve the conduits for different purposes can be of any appropriate size.

An object of the invention is to provide an excess flow check valve which will close and operate consistently whether assembled with a supporting male fitting in a full coupling, half coupling, or a coupling of less length, carried by a tank that is dispensing compressed gases.

A further object of the invention is to provide an excess out-flow check valve which can be used in an inflow filler conduit or fitting without interfering with full filling flow capacity.

A further object is to provide an effective back flow check valve for filling operations which serves consistently as an excess flow check valve for dispensing operations.

The invention is further characterized by an excess flow checking of high accuracy and consistency for restricted vapor phase eduction yet accommodates full capacity flow liquid phase filling operations.

The invention is also characterized by a bi-directional valve, construction of different flow characteristics which is simple in construction and assembly and readily adaptable for installation and use with other valves and fittings in either one of two axially disposed orientations.

These being among the objects other and further objects will be apparent from the appended claims and the description of the drawing in which:

FIG. 1 is a sectional view taken through a hand shut-off valve with dispensing and filling fittings shown diagrammatically in one plane for ease of understanding, and the preferred form of the check valve construction mounted in place thereon with the check valve shown in its normal, alert position under working conditions;

FIG. 2 is a sectional view of a portion of the arrangement shown in FIG. 1 showing the check valve in its full filling flow accommodating position;

FIG. 3 is a sectional view similar to FIG. 2 showing the check valve in its closed eduction or outflow checking position;

FIG. 4 is a sectional view showing another arrangement embodiment of the valve, for different orientation; and FIG. 5 shows the detailed construction of a valve stem which may be readily assembled in either of the arrangements illustrated.

In the drawing, and referring to FIG. 1, a storage tank for liquefied gas is shown at 11 having an opening 12 in the top side to receive a threaded coupling 14 therein as secured in sealed relation by a weld 15. A hand shut-off valve 16 is threaded at its base 17 into the coupling to close said opening. The coupling shown is a half coupling. Other lengths can be used.

The shut-off valve comprises a body 18 having a Y-shaped passage 20 therethrough which affords a particular flow rate capacity through a restricted opening 21 preferably forming the throat of a venturi section 19 of the passage as located essentially within the protective confines of the coupling 14, which opening for purposes of later comparisons can be considered to be approximately a 15/16 inch opening. A valve opening or port 22 with a valve land 23 is shown at the upper end of the leg 20L of the passage 20 which is closed by a valve seat disc 24 controlled by a valve stem 25 threaded in a bonnet 26 for movement from its closed position, shown in full lines, to its open position shown in broken lines 29. A handle rotates the valve stem and a chevron packing 28 retained by a gland nut 30 seals it.

On the valve side of the port 22 the passage 20 bifurcates into an eduction passage 20E through a threaded boss 31 receiving a service line 32 which receives in its outlet either a weather closure (not shown) or a filler line 33 with a nozzle 34 held in place by a coupling 39 secured by Acme threads 35 and sealed by a compression washer 36. Whenever the valve 24 is open, fluid can flow in either direction through the valve port 22 either from the filler passage 20F into the tank, or from the tank out through the service line 32, or both during the brief filling operation if both occur together, it being appreciated that an excess flow check valve will close if a rupture occurs in the filling line or if outflow from the tank is excessive.

The lower end of the shut-off valve is counterbored at 36 to provide an integral valve seat 37 and shoulder 38, which requires no internal seals. The counterbore wall is threaded at 40 to receive in supported relation the excess flow check valve assembly 41 which includes a cup-shaped retainer body 42 having lateral openings 47 and an axial bore 49. A stem 43 is axially reciprocable therein, is held at one limit of its movement by spring 45, and in turn slidably supports a check valve disc 44 normally held by the spring and stem at an intermediate resting or poised position. The spring 45 yields to movement of the disc and stem together in one direction under excess fluid eduction flow and a second spring 46 supports the disc in its resting position but is yieldable to permit movement of the disc on the stem in the opposite direction under fluid filling flow. The openings 47 are formed by milling off the bottom and opposite sides of the cup in a chordal fashion to a depth that is approximately ⅔ of the radius of the cup whereby the openings open axially as well as laterally.

More particularly, the retainer body has a cylindrical portion 48 at the top thereof externally threaded at 50 to engage threads 40 with the lip edge engaging the shoulder 38. The upper edge 51 of the openings 47 are located low enough to clear the lower end of the base 17 with the inside diameter of the cylindrical portion larger than the diameter of the valve seat 37 to provide sliding clearance adequate for the disc 44 to engage and close against the valve seat with an upward movement. When closed a bleed opening 52 through the disc gradually balances pressures on both sides.

The valve disc 44 has a spherical contour providing a concave recess 53 on its lower face that cooperates with the bottom wall 54 of the retainer body 42 to provide a cavity accommodating the conical spring 46 when fully compressed upon downward movement of the valve disc induced by incoming fluid so that the edge of the valve disc preferably contacts the interior bottom of the retainer body. Thus, the valve disc is slidable on the stem during filling operations to its fully open position.

The stem preferably is slidably received in the bore, being formed of two headed parts 55 and 56 (FIG. 1) threaded end to end at their shanks as at 57. The upper part is of larger diameter above the bore as at 60 to provide a stop shoulder 58 (FIG. 5) limiting downward movement of the stem. The valve disc 44 is received on the enlarged part as retained by the head 61 thereon and the spring 45 is mounted on the lower part 56 below the retainer body as held in place by the lower head 62 to hold the stem against the stop 58 in locating the disc in its resting position. The spring 45 will yield upon upward movement of the disc and stem under excess fluid eduction flow as shown in FIG. 3 where the disc is closed against the valve seat 37. When the valve closes under excess flow conditions, it snaps shut with a force over-propelling the shaft 43 and if the retainer body is made of aluminum, a steel washer 62a is interposed to prevent damage to the body by such movement of the shaft.

If desired, the stem can be made as shown in FIG. 5 of a single piece of rod stock with a groove 63 at its spring end to receive a washer 64 and snap ring 65 therein that serves as a lower head 62.

Referring to another embodiment in FIG. 4, the valve stem 43a is of uniform diameter throughout its length between the head 62 and the assembled head 63a. In this embodiment a sleeve 66 having a terminal flange 67 is slidably mounted on the valve stem 43a to receive the valve disc 44 slidably thereon. The flange 67 serves the same purpose as head 61 serves and the other end 68 of the sleeve 66 serves as the stop shoulder 58.

In this embodiment the excess flow spring 45 can also be mounted below the retainer body as shown in the other views, but is shown above the valve disc 44 where the upper end of the stem is received within the valve passage leg 20L. As thus arranged, the valve disc slides on the stem along with the valve under excess fluid flow eduction conditions while the valve disc slides on the sleeve under filling flow conditions.

Although the effective flow area of the valve port 21 is reduced by the presence of the stem 43a therethrough it does not affect adversely the excess flow check performance characteristics of the valve because the remaining flow area around the stem is still larger than that considered to be the critical flow area through the openings 47 above the disc 44 in its resting position. Accordingly, a wide range of spring rates can be selected for the spring 45 for different installations for different flow rates.

By way of example, but without limitation, relative proportions can be better understood with a valve having a disc 44 diameter of 1″ which provides an area of .785 sq. in. The opening area of the valve port 21 is .688 sq. in.; the area of the lower opening of the coupling 14 is 1.76 sq. in.; and, the flow area through the openings 47 above the disc 44 in its resting position is .6125 sq. in. Thus, with a pressure exerted over a .785 sq. in. disc valve area and a flow through a .6125 sq. in. area into a .785+ sq. in. valve chamber area for flow through a .688 sq. in. port area, these being constant in any installation, it only remains to determine the pressure drop across the valve disc which would be considered to be critical or unsafe and then select the spring 45 whose rate would yield at that pressure. Then, once the valve starts to close, the critical area (.6125 sq. in.) is lessened and the pressure differential quickly increases to overcome the spring completely and snap the valve to its closed position. Pressure differentials in the range of 12 to 15 p.s.i. are generally provided for, and with the present invention the performance of the valve will be consistent for all installations since the full areas on both sides of the valve are fully exposed to gas flowing conditions. This is true even if the valve was received in a conduit only ⅓ again larger in diameter than the diameter of the valve disc.

In the above example the spacing of the valve disc from its lowermost position not only allows the valve disc to close consistently whether assembled in a full coupling, a half coupling or less, but this spacing goes to zero in filling operations to provide maximum filling flow of liquid or gas.

Having thus described, several embodiments of the invention, the relationship and operation of the parts, it will be readily understood how the objects of the invention are attained and how further modifications may be provided including making the valve seat integral with the retainer body and varying the radial depth of the chordal cuts made in the retainer body to provide the windows as well as varying the height of the valve disc in the lateral openings, without departing from the spirit of the invention the scope of which is commensurate with the appended claims.

What is claimed is:
1. A multiple purpose flow control valve for fluids under pressure comprising
    a cup-shaped retainer body having lateral access fluid flow openings through the lower portion of the side wall thereof and an axial bore through the bottom wall thereof,
    valve seat means proximate to the upper edge of the side wall and facing towards said bottom wall for fluid flow therethrough under pressure,
    valve stem means mounted in said axial bore,
    stop means carried by said stem means a predetermined distance below the valve seat means and below the upper limits of said flow openings,
    valve disc means slidably mounted on said stem means for movement between said bottom wall and said stop means during filling operations, first spring means urging said disc means against said stop means and yielding during filling operations, a second spring means carried by the stem means urging said stop means to its said predetermined position and yielding with movement of the stop means and valve disc means towards said valve seat to close the valve port under excess flow conditions.

2. The combination called for in claim 1 in which said lateral openings extend chordally through the bottom wall, said stem extending below and being slidable through said bore and terminating in a head portion, said second spring means being disposed between said bottom wall and said head portion.

3. The combination called for in claim 1 in which said stem has a stop shoulder engaging the inside face of said bottom wall when said stop means is at said predetermined distance, said first spring means being disposed between said disc means and the inside face of the bottom wall.

4. A multiple purpose flow control valve means for fluids under pressure comprising a valve body with a passage therethrough, a cup-shaped retained body having lateral access fluid flow openings through the wall thereof and an axial bore in the bottom wall thereof, a valve seat between said bodies facing said axial bore, valve means carried by said retainer body including a valve disc disposed within the retainer for axial movement across said fluid flow openings, stem means received in said bore slidingly supporting the valve disc for closing against said valve seat in a valve disc closed position, resilient means urging said disc towards the valve seat and yielding to movement of the disc away from said valve seat to a fully open position, stop means on the stem means limiting movement of the valve disc towards the valve seat to determine the distance between the valve seat and the valve disc in an intermediate poised position for excess flow actuation, and spring means urging said stop means away from said valve seat and yielding with movement of the valve disc towards said valve seat to close said valve port under excess flow.

5. The combination called for in claim 4 in which the flow area through said openings above said valve disc in resting position is substantially less than the valve port area, and the full flow area of the openings above the disc in its wide open position is substantially greater than the valve port area but less than the flow area through the retainer body and between the valve disc and the coupling.

6. The combination called for in claim 4 in which the fluid flow openings extend axially through the bottom wall exposing the bottom of said valve disc to fluid flowing in the direction urging the valve disc to its closed position, said valve disc having a recess on its lower face accommodating said resilient means in its fully open position.

7. A multiple purpose flow control valve for fluids under pressure comprising a coupling and a valve body having an externally threaded mounting boss received in said coupling and with a passage therethrough terminating in a valve seat defining a valve port within the boss, a cup-shaped retainer means supported on the box proximate to the valve seat and having lateral access fluid flow openings through the wall thereof below said boss and an axial bore in the bottom wall thereof, valve means carried by said retainer means including a valve disc disposed within the retainer for axial movement across said fluid flow openings, stem means received in said bore slidingly supporting the valve disc for movement of the valve disc between a closed position against said valve seat and a fully open position away from said valve seat, stop means on the stem means limiting movement of the valve disc towards the valve seat to an intermediate poised position spaced a predetermined distance from the valve seat, resilient means urging said disc towards the valve seat to disposed said valve in said poised position and yielding to movement of the disc away from said valve seat to a fully open position, and spring means urging said stop means away from said valve seat to dispose said stop means in said valve disc limited position and yielding with movement of the valve disc towards said valve seat to close said valve port.

8. The combination called for in claim 7 in which said passage through said flow control valve has a shut-off valve in it and bifurcates into a service branch and a filler branch, at the outer end and a venturi at the other end, the flow area of said service branch being less than the flow area of each of said shut-off valve and said filler branch, the flow area of said valve port being less than the flow area of said shut-off valve and disposed at the throat of said venturi section one end of which includes said valve seat, and said lateral access openings disposed above said valve disc in its fully open position extending beyond the adjacent end of said coupling to provide a flow area greater than said valve port.

9. The combination called for in claim 7 in which the valve disc is disposed a substantial distance below the adjacent end of said coupling in its fully open position.

10. The combination called for in claim 7 in which said lateral openings extend axially through the bottom wall exposing the lower face of the valve disc at all times to axial flow of fluid past said valve disc towards said valve seat.

11. The combination called for in claim 7 in which said valve disc is concave on its lower side to accommodate said resilient means when in fully open position and has a bleed means through it to equalize pressures on opposite sides thereof when in its closed position.

References Cited

UNITED STATES PATENTS

| | | | |
|---|---|---|---|
| 1,984,107 | 12/1934 | Baker | 137—543 XR |
| 2,138,000 | 11/1938 | Ehlers | 137—540 XR |
| 2,967,541 | 1/1961 | Norway | 137—517 XR |

ALAN COHAN, *Primary Examiner.*

WILLIAM H. WRIGHT, *Assistant Examiner.*

U.S. Cl. X.R.

137—529, 543, 543.15, 613